United States Patent

Cruse

[15] 3,642,249
[45] Feb. 15, 1972

[54] SLIDE VALVE
[72] Inventor: Lee H. Cruse, Springfield, Mo.
[73] Assignee: Foster Manufacturing Co., Inc., Springfield, Mo.
[22] Filed: Mar. 3, 1970
[21] Appl. No.: 16,113

[52] U.S. Cl. ....................................................251/344
[51] Int. Cl. ..........................................F16k 31/60
[58] Field of Search ...........................251/342, 344

[56] References Cited

UNITED STATES PATENTS

| | | | |
|---|---|---|---|
| 3,106,378 | 10/1963 | Hellstern | 251/344 |
| 3,106,379 | 10/1963 | Sciuto et al. | 251/344 |
| 3,127,149 | 3/1964 | Cruse | 251/344 X |
| 3,425,664 | 2/1969 | Niskin | 251/344 |

*Primary Examiner*—Samuel Scott
*Attorney*—John D. Pope, III

[57] ABSTRACT

A slide valve includes a cylindrical body provided internally with first and second fluid chambers and having first and second ports extending from its outer cylindrical surface into the first and second fluid chambers, respectively. A sleeve is slidably mounted on the body and includes an internal annular groove which is slidably movable from a closed position wherein the groove is axially spaced from a closed position wherein the groove is axially spaced from the second port to an open position wherein it overlies both the first and second ports. A detent ring surrounds the body and is adapted to engage the sleeve as it moves from its open to its closed position. The detent ring protrudes radially outwardly from the outer surface of the body so as to yieldably resist the sliding movement of the sleeve toward its closed position.

9 Claims, 3 Drawing Figures

PATENTED FEB 15 1972    3,642,249

INVENTOR
LEE H. CRUSE
BY
ATTORNEY

SLIDE VALVE

This invention relates to a slide valve.

Among the several objects of the present invention may be noted the provision of a slide valve which will not slide from or vibrate loose from its open position during use; the provision of a slide valve which can be manually moved between its open and closed positions; the provision of a slide valve including reliable sealing means which do not leak substantially when the valve is in use; the provision of a slide valve having a simply constructed detent for holding the slide in its open position; and the provision of a slide valve which is economical to manufacture and durable in use. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a partial sectional view of the body of the slide valve;

Corresponding reference characters indicate corresponding parts throught the several views of the drawings.

Figure 1:
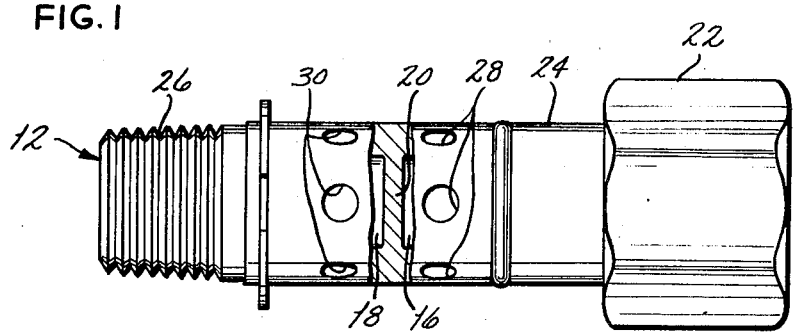

A slide valve 10 includes a body 12 having a sleeve 14 slidably mounted thereon. Body 12 includes first and second chambers 16, 18, which are formed by bores extending inwardly from the opposite ends of body 12. A dividing wall 20 separates fluid chambers 16, 18. The right end (FIG. 1) of body 12 is externally provided with a head 22 having wrench flats thereon. Extending to the left from head 22 is a cylindrical shank 24 which terminates at its left end in a threaded portion 26. Extending radially inwardly from the outer surface of shank 24 into first fluid chamber 16 are a plurality of first ports 28. Extending radially inwardly from the outer surface of shank 24 into the interior of second chamber 18 are a plurality of second ports 30.

Sleeve 14 is provided on its internal surface with an annular groove 32 which is positioned axially between forward and rear bearing portions 34, 36. Forward and rear bearing portions 34, 36, each include a pair of annular flanges 38 which surround and slidably engage the outer cylindrical surface of shank 24. An elastomeric O-ring 40 is seated within each pair of annular flanges 38. O-rings 40 engage the outer cylindrical surface of shank 24 to provide a fluidtight seal between sleeve 14 and shank 24. Sleeve 14 is axially movable on shank 24 from a closed to an open position. In its closed position, sleeve 14 abuts against head 22 with groove 32 overlying first ports 28 and being axially spaced from second ports 30. When sleeve 14 is in its open position, groove 32 overlies both first ports 28 and second ports 30. Thus the line of communication between first ports 28 and second ports 30 is closed when valve 14 is in its closed position. When valve 14 is in its open position, however, groove 32 bridges first and second ports 28, 30, and permits fluid to flow from first fluid chamber 16 through first ports 28, through second ports 30, and into second fluid chamber 18.

Surrounding shank 24 is an elastomeric detent ring 42 which is seated in an annular groove 44 surrounding shank 24. Detent ring 42 has a sufficient cross-sectional thickness so that its outer diameter protrudes radially outwardly beyond the external cylindrical surface of shank 24. Detent ring 42 is constructed of an elastomeric material which will compress radially inwardly in response to moderate pressure. Its axial position on shank 24 is such that it engages sleeve 14 as it moves from its open to its closed position and yieldably resists sliding movement of sleeve 14 toward its closed position. However, detent ring 42 is radially compressible in response to the axial sliding movement of bearing portions 34, 36, over detent ring 42. Thus bearing portions 34, 36, can be forced manually to slide over detent ring 42 in order to slide sleeve 14 from its open to its closed position, but bearing portions 34, 36, will not slide over detent ring 42 during normal jarring and vibration of valve 10.

Figure 2:
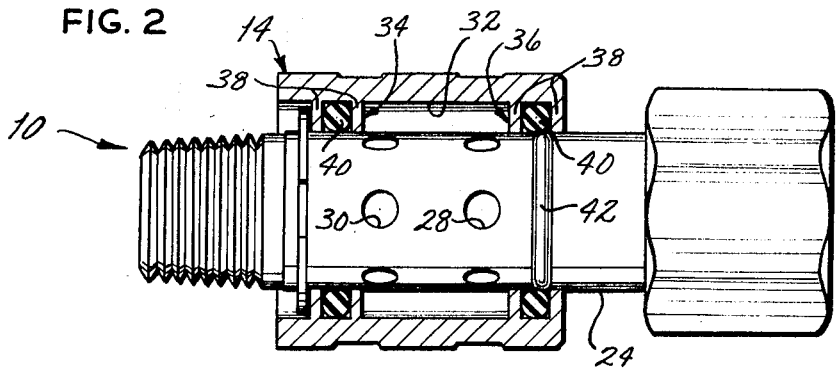
FIG. 2 is a partial sectional view showing the sleeve in its open position.
Figure 3:
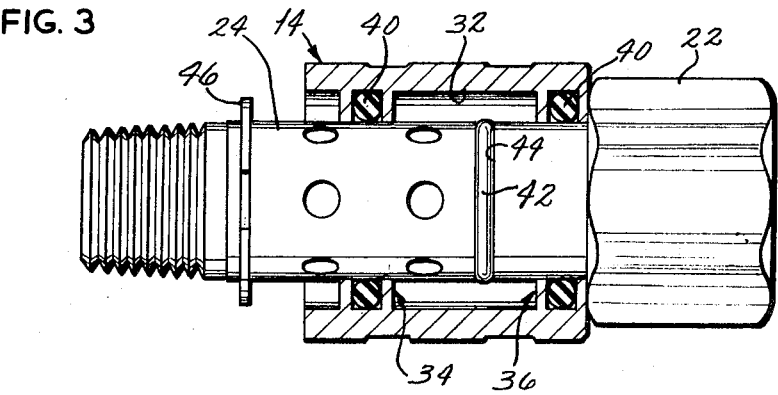
FIG. 3 is a partial sectional view showing the sleeve in its closed position.

Referring to FIG. 2, detent ring 42 is shown engaging rear bearing portion 36 when sleeve 14 is in its closed position. While this is the preferred positioning of detent ring 42 on shank 24, it could alternatively be positioned to engage forward bearing portion 34 for preventing its movement to the right.

A stop member 46 is mounted on the external surface of shank 24 and is positioned to engage sleeve 14 and limit its movement to the left, as viewed in the figures, when it reaches its closed position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A slide valve comprising a cylindrical body internally provided with first and second fluid chambers, first and second fluid ports in the outer cylindrical surface of said body extending into said first and second fluid chambers respectively, a detent member on said cylindrical body and a control sleeve movably mounted on said body and including an internal annular recess formed to overlay said first and second ports to provide a path of communication between said ports, said control sleeve further including internal spaced O-rings slidably supporting said control sleeve on said cylindrical body for reciprocating axial movement of said control sleeve from a closed position of said valve wherein the annular recess of said control sleeve is displaced away from one of said ports to an open position of said valve wherein said annular recess overlies both said first and second ports for communication therebetween, said detent member being positioned on said cylindrical body such that at least one of said O-rings is moved over said detent member, when said control sleeve is moved from one of said positions to the other said position, said one of said O-rings abutting said detent member in the other said position of said control sleeve, the abutment of said detent member and said one O-ring restraining reverse movement of said sleeve from the other said position to the one said position.

2. A slide valve according to claim 1 wherein said O-rings are retained in said control sleeve at opposite end portions thereof, said O-rings being elastomeric and forming a fluidtight seal between said control sleeve and said cylindrical body.

3. A slide valve according to claim 1 wherein said annular recess overlays said detent member when said sleeve is in its closed position.

4. A slide valve according to claim 1 wherein one of said fluid ports is freely exposed to the environment outside said body when said valve is in its closed position.

5. A slide valve according to claim 4 wherein said annular recess overlies the other said fluid port when said sleeve is in its closed position.

6. A slide valve according to claim 1 wherein said detent member on said cylindrical body protrudes radially outwardly from said body so as to resist sliding movement of said one O-ring over said detent member.

7. A slide valve according to claim 6, said spaced O-rings including first and second O-rings at opposite end portions of said control sleeve and wherein said detent member is disposed adjacent one of said ports on said cylindrical body and away from the other said port, said valve further including a stop member for limiting movement of said control sleeve, said stop member disposed on said cylindrical body adjacent the other said port and away from said one port such that in the open position of said valve one end portion of said control sleeve abuts said stop ring and at least one said O-ring is positioned intermediate said detent member and said stop member in abutting relationship with said detent member.

8. A slide valve according to claim 6 wherein said detent member is positioned intermediate said spaced O-rings in the open position of said valve, such that one of said O-rings is in abutting relationship with said detent member.

9. A slide valve according to claim 6 wherein said detent member comprises an O-ring.

* * * * *